July 21, 1964 H. W. SCHRIMPF 3,142,043
INFORMATION HANDLING APPARATUS FOR DISTRIBUTING
DATA IN A STORAGE APPARATUS
Filed July 28, 1960 3 Sheets-Sheet 1

INVENTOR.
HENRY W. SCHRIMPF
BY Henry L. Hanson
ATTORNEY

INVENTOR.
HENRY W. SCHRIMPF
BY Henry L. Hanson
ATTORNEY

July 21, 1964 H. W. SCHRIMPF 3,142,043

INFORMATION HANDLING APPARATUS FOR DISTRIBUTING DATA IN A STORAGE APPARATUS

Filed July 28, 1960 3 Sheets-Sheet 3

INVENTOR.
HENRY W. SCHRIMPF

BY Henry L. Hanson

ATTORNEY

United States Patent Office 3,142,043
Patented July 21, 1964

3,142,043

INFORMATION HANDLING APPARATUS FOR DISTRIBUTING DATA IN A STORAGE APPARATUS

Henry W. Schrimpf, Waltham, Mass., assignor to Minneapolis-Honeywell Regulator Company, Minneapolis, Minn., a corporation of Delaware Filed July 28, 1960, Ser. No. 45,995
11 Claims. (Cl. 340—172.5)

A general object of the present invention is to provide a new and improved information handling apparatus. More specifically, the present invention is concerned with a new and improved apparatus which may be an integral part of a data processing system wherein the apparatus is characterized by its ability to provide for the flexible handling of words of information as they are transferred within the system with due provision being made for recognizing the presence of variable length records which may be composed of items which are also of variable length in terms of the number of words within each item.

Data processing systems are frequently organized with the heart of the system comprising a central processor which contains control units, arithmetic units and high-speed storage which is readily accessible to the control and arithmetic circuits associated with the central processor. Surrounding the central processor are input and output communicating channels leading to peripheral devices. Such peripheral devices may well take the form of card readers for supplying input data, bulk storage devices such as magnetic tapes or drums for storing the large masses of data, and output printers for providing a visual record of the result of the data processing.

In many data processing problems, it is desirable to organize the data in the associated data processing system in the form of a series of uniform length coded elements conveniently referred to as words. Such words are usually of fixed bit length and may represent data coded in numeric form, alphabetic form, or alphanumeric form. A convenient length of word for use in the data processing system will frequently not be long enough to encompass all the desired information related to a particular matter. Consequently, several words may be associated together in what is conveniently termed an item. In addition, several items may be combined into what is conveniently termed a record.

The handling of records of information with respect to the bulk storage apparatus of a data processing system may be arranged so that the record is stored as one continuous set of information. Inasmuch as the length of any one record may be variable, it is essential that appropriate control signals be included to identify the over-all record length as well as the length of the individual items which go to make up the complete record.

Inasmuch as the individual records are frequently operated upon within the central processor in terms of the items making up the record, it is frequently convenient to arrange the different items in different locations within the main memory of the central processor. In order to effect this, it is advantageous to transfer the individual items to the appropriate assigned spots within the memory as the items are being received. This can result in a considerable time-saving in a data processing problem and is particularly useful in a data processing system which incorporates multi-programming or parallel processing facilities in that each of the separate items, upon delivery to their assigned spots in the memory, can be operated upon at substantially the same time.

After the data processing with respect to the items of information has been effected, a transfer of data from the memory in the central processor to a peripheral device may be readily effected directly from the locations of the various items to some peripheral device. In other words, the data for a particular record need not be assembled as a unit within the main memory prior to its transfer out of the central processor.

It is therefore a further more specific object of the present invention to provide a new and improved data processing system having highly flexible capabilities relative to the transfer of multiple word items and/or multiple item records.

The principles of the present invention have been realized around a data processing system which includes both a control memory and a main memory. The control memory appears in the central processor as a large number or special registers which are selectively available for providing control data for various data processing operations including the transfer features associated with the present invention. The special registers of the control memory may be divided among a number of different program groups with selected registers within each group being assigned predetermined functions. In this regard, special counting functions may be provided for both the counting of the words transferred and the utilization of the counting operation for addressing the main memory of the central processor for either a reading or a writing function.

A still further object of the present invention is therefore to provide a new and improved data processing system incorporating a series of special registers adapted to be used as counters for the purpose of transferring in a predetermined sequence a number of data processing words relative to the main memory of the system.

In connection with the use of the special registers for counting and addressing the main memory, the system must also be capable of recognizing whether or not data being supplied to the main memory is coming in in a forward or reverse direction. In order to provide the necessary control, the control data used in addressing the main memory must be selectively incremented or decremented in accordance with whether or not there is a forward or reverse reading of the information.

Another object of the invention is then to provide a new and improved data processing system wherein the control data for addressing a main memory in the system is selectively incremented or decremented in accordance with the order in which the data is being supplied by a peripheral device.

Another feature of the invention lies in its ability to selectively change the control data used in addressing the main memory in accordance with the data being transferred or special indicators associated therewith. Thus, in connection with the handling of separate items, an appropriate end-of-item indicator carried with the items can be utilized to effect a control operation which changes the major control data for addressing the main memory from one sequence to another.

A further object of the invention is therefore to provide a data processing system wherein control data for directing the sequential transfer of words of information relative to the main memory may be selectively changed to another sequence upon the occurrence of special indicating data which separates individual items.

The foregoing objects and features of novely which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
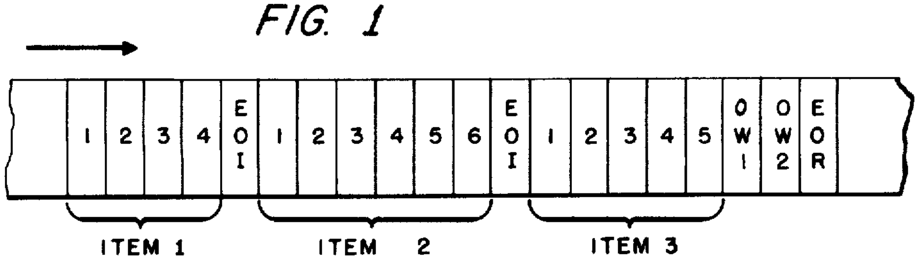
FIGURE 1 represents the manner in which a record of information may be stored on a section of magnetic tape.

Referring first to FIGURE 1, there is here illustrated a section of magnetic tape 10 on which is recorded a complete record of information which relates to a particular data processing problem. The record is defined at its limits by the presence of word 1 of the first item and at the other extreme by an end-of-record indicator EOR. The record will be seen to comprise three items, item 1, item 2 and item 3. In order to separate the items, there is positioned between word 4 of item 1 and word 1 of item 2 an end-of-item indicator EOI. Similarly, between word 6 of item 2 and word 1 of item 3, there is also recorded a further end-of-item EOI. In one embodiment of the invention, each record of the information on magnetic tape had included therewith two words of information used for automatic error correction purposes and sometimes referred to as ortho-words. These words are indicated as OW1 and OW2 in FIGURE 1.

Figure 2:
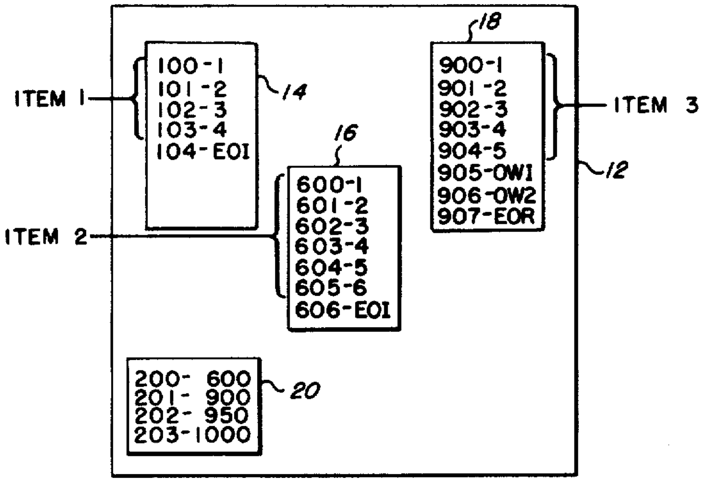
FIGURE 2 represents diagrammatically the manner in which control data and items of a particular record may be distributed in a memory of a data processing system.

In transferring information from the magnetic tape 10 into the main memory, it is desired that the individual items be specifically located in separate groups of memory locations and that the words within each item be located in sequential memory locations within each group. Thus, referring to FIGURE 2, there is diagrammatically illustrated a high speed memory unit 12 which may well be of the well known coincident current type memory having a plurality of addressable storage locations which may be selected in any desired order of sequence by apparatus associated with the addressing lines for the memory. As shown in FIGURE 2, it is assumed that at least three sections of the memory, i.e. three groups of memory locations, have been set aside specifically for handling items of information coming in. The section 14 may be referred to as that section whose initial address is defined by the address 100. A further section 16 may be referred to as a section whose first address begins with the number 600. A still further section 18 may be defined as that section which has an initial address of 900. A further section 20 having an initial address of 200 may well be a section of the memory set aside for control purposes.

By way of example, it may be assumed that it is desirable to transfer the record of information illustrated on the tape 10 of FIGURE 1 into the memory 12 illustrated in FIGURE 2. By loading an appropriate control order into the apparatus directing the operation of the system, it is intended that the record of information be distributed in the memory sections 14, 16 and 18 and that the individual words of each item be appropriately recorded in sequence within the sections assigned to the particular item. It is thus desirable that item 1 of the record be located in memory 12 with the first word stored at address 100, the second word stored at address 101, the third word stored at address 102 and the fourth word stored at address 103. The end-of-item indicator EOI between item 1 and item 2 may well be stored at address 104.

On the occurrence of the end-of-item signal EOI, apparatus, discussed in detail below, will be effective to go to the control section 20 in the main memory 12 and select the next section wherein the next item is to be recorded. For this purpose, a table of control data may well be recorded at the memory positions indicated at 200, 201, 202 and 203 within section 20. Located at address 200 is the control number 600 which may be used to specify the address for word 1 of the second item. By sequentially incrementing the number 600 successive words of item 2 will then be recorded in the memory address locations 601 through 605 for the words 2 through 6 respectively. The end-of-item EOI for this particular item will then be recorded at address 606.

The selection of a further storage section in the main memory 12 will be effected by the sensing of end-of-item EOI between the item 2 and the item 3. In this instance, the control data from the section 20 will result in the number 900 being selected in the next address for the third item. The individual words of item 3 will then be sequentially written in to the section 18 at the consecutive memory locations starting with the number 900 and running through 904. In addition, the ortho words OW1 and OW2, as well as an end-of-record signal EOR, will also be recorded in these sequential memory positions starting with address location 905.

The control data for subsequent items in a record containing more than three items as illustrated in FIGURE 1 might well be derived from the control section 20 in a manner to be described fully below.

Once the data has been stored in memory 12, a subsequent write order may be used to transfer the data back to the tape in the format illustrated in FIGURE 1. This writing may take place directly from the distributed memory locations using the same principles discussed below in connection with a tape read operation.

Figure 3:
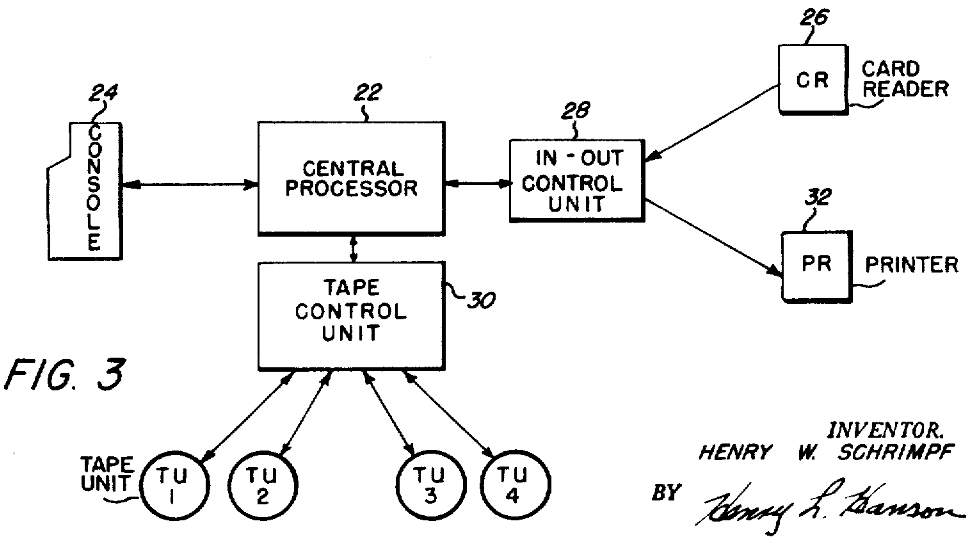
FIGURE 3 represents a form of data processing system with which the present invention may be associated.

Referring next to FIGURE 3, there is here illustrated a representative diagram of a data processing system. The data processing system illustrated is one which contains a central processor 22 which has communicating therewith a console 24, the latter of which is adapted to be under the control of a manual operator. Data for the central processor 22 may be supplied by way of a card reader 26 which operates through an input and output control unit 28. Data coming into the central processor by way of the control unit 28 may well be processed and then applied to one or more of the tape units TU1 through TU4 which communicate with the central processor 22 by way of a tape control unit 30. Data may be transferred out of the central processor by way of control unit 28 to a suitable printing device 32.

A typical mode of operation for a data processing system such as illustrated diagrammatically in FIGURE 3 would be for an operator to load an appropriate control program into the central processor by way of the control console 24. Once the initiating program is inserted into the central processor, further data for defining a program may be supplied by way of the input card reader 26 and control unit 28. Once a complete program has been loaded into the central processor, the system may then be used for data processing purposes of numerous types which may well relate to business problems as well as scientific problems.

A typical operation of a data processing system might be the updating of records of information stored on a master file on one of the tape units of the system. Such a record might well be an inventory record which includes three items, with item 1 being the part name and location of the part. Item 2 of the record might well include a part number and an associated stock number. Item 3 of the record might well include quantity information relating to quantity on hand as well as on order, and other related data.

In connection with the data processing relative to this inventory record, it is assumed that quantity information as well as location change data is to be processed against the master file in order to update the entire record. In order of sequence, the updating data may well be read in from punched cards or the like and then stored in a predetermined section in the high speed memory of the central processor. The entire inventory record from the master file may be read in as indicated, for example, in FIGURE 2. Individual updating words in the items may well replace words currently in the items of the master record in order to update the information. In a data processing system of the type described in the copending application of the present inventor entitled "Information Handling Apparatus," Serial Number 754,253, and filed August 11, 1958, now Patent No. 3,029,414, there is disclosed a data processing system having multiple program or parallel processing capabilities. In the case of updating a record of information, the individual items may well be updated by separate programs and once the items have been updated they may then be transferred back to the master record file.

By using the distributed reading and writing facilities set forth in the present invention, it is possible to enhance the speed at which such an updating operation can be carried out.

Figure 4:
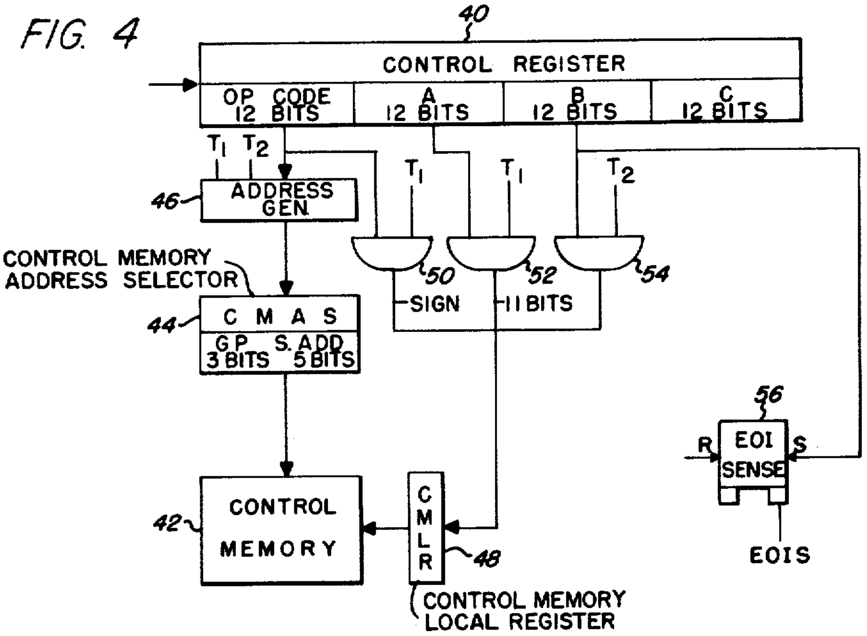
FIGURE 4 illustrates a diagrammatic circuit for initially bringing into operation the features of the present invention.

Referring next to FIGURE 4, there is here illustrated apparatus which may be used for preparing the data processing system for a reading or writing operation in accordance with the principles of the present invention. In FIGURE 4, the numeral 40 defines a control register which may be associated with a central processor of a data processing system. As used herein, the control register is the residing place of an instruction word which is to be performed by the data processing system. Thus, where it is desired to perform a tape read operation from one of the tape units into the main memory of the central processor, a read order will first be inserted into the control register 40.

In one embodiment of the invention, the read order took the form of a three-address type order whose over-all length was 48 bits. The first 12 bits of the order are defined as the operation code bits and include appropriate control data related to the particular peripheral device being used. The second 12 bits define a number A which may well be address information, as will be more fully explained below. Similarly, the B section of the instruction word is comprised of 12 bits, which may also act as control data, such as address information. In the case of the C section of the instruction word, this is likewise 12 bits in length and, in the preferred system, is used to define a change in sequence in the operation of the system.

Also included in FIGURE 4 is a control memory 42 which may well take the form of a conventional coincident current memory having an appropriate address selection circuit. This is indicated in the figure at 44 as the control memory address selector CMAS. The address selection code for the control memory is assumed to be represented as an 8-bit code with 3 bits of the code defining a program group, such as one of eight possible programs in operation. The remaining 5 bits of the address code define a sub-address within the group definition within the control memory 42. In a data processing system of the present type, the address used in the control memory address selector 44 may be derived from program data or informational data. In connection with the presently described invention, the address data for the control memory address selector 44 is assumed to be derived by way of an address generator 46 which recognizes the operation code bits of the instruction word in the control register, and these operation code bits are appropriately examined and clocked by timing pulses to set the desired address data in the address selection circuit 44.

Also associated with the control memory 42 is an input register 48, sometimes referred to as a control memory local register CMLR. As shown in FIGURE 4, the control memory local register 48 receives input information and control data by way of a series of gating circuits 50, 52 and 54. Also associated with the control register 40 is an end-of-item sensing circuit 56 which is adapted to be set in the event that there is valid information in the B section of the instruction word in the control register 40.

Figure 5:
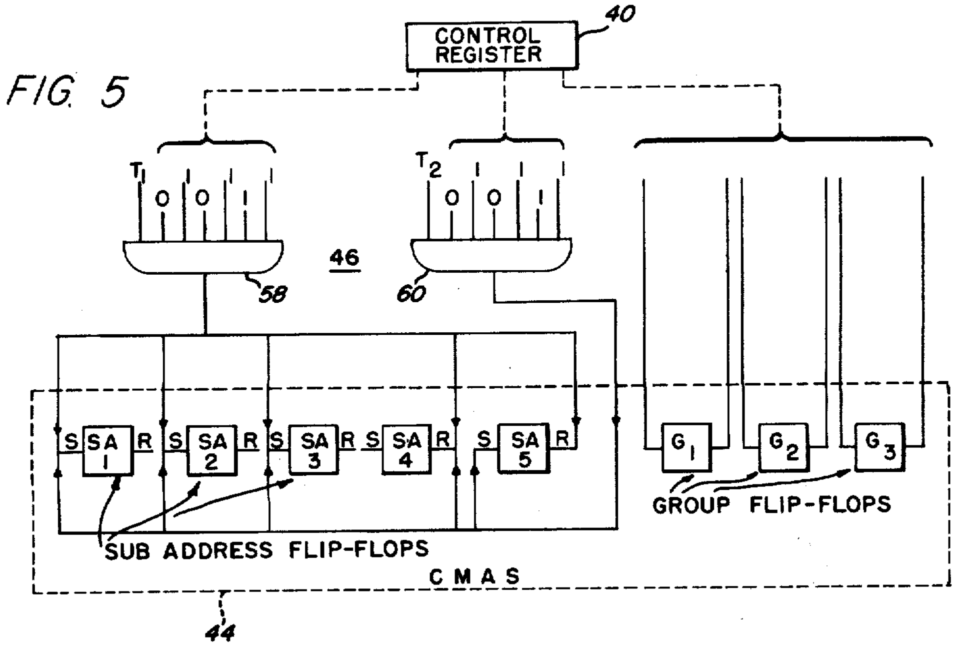
FIGURE 5 illustrates an expanded diagrammatic showing of a portion of the circuitry of FIGURE 4.

Once the instruction word has been inserted into the control register 40, the operation code bits will be examined by way of the address generator 46. The address generator 46 may take the form of any type of a code conversion circuit, such as is illustrated in FIGURE 5. The manner in which the code conversion operates will, of course, be dependent upon the address configuration required in the control memory address selector 44.

Assuming that the control memory is being set up for a read forward instruction, the operation code will then comprise 6 bits of information. In one embodiment of the invention, the read forward code took the binary form of 010111. At time T1, as illustrated in FIGURE 5, a gating section 58 is set up to pass a pulse if the above read forward operation code is received at the control register. The output of the gate is adapted to be coupled to a series of address selection flip-flops in the control memory address selector 44. Thus, for example, in a read forward order RF, the sub-address flip-flops SA1, SA2, and SA3 will all be switched to the set state. The sub-address flip-flops SA4 and SA5 will be switched to the reset state. The group flip-flops $G_1$ through $G_3$ will be set in accordance with the group code in accordance with the group code portion of the instruction word. With the control memory address loaded into the selector 44, the address lines will be activated so that at time T1 the control data or number from the A section of the instruction word may be transferred through the gate 52 into the control memory local register 48 wherein a sign may be appended thereto and the result inserted into the control memory 42 at the address selected. On a read forward order, the sign will be a plus. The particular address where this data is inserted is a special register location which is conveniently referred to as a read address counter register. In the case of the configurations set forth above in FIGURES 1 and 2, the A section of the read forward order would be +100.

The incoming operation code by way of the address generator 46 at time T2 will be by way of a gating circuit 60, which will now act to set the sub-address circuit SA5 in the control memory address selector and retain all the other sub-address flip-flops in the state that they were previously set. This new address defines the location of the special register which defines how the second and subsequent items of information are to be stored in the main memory as they come in. It is sometimes conveniently referred to as a distributed read address counter register. With the setting of the control memory address selector, the conrtol data from section B of the instruction word will pass by way of the gating circuitry 54 into the control memory local register 48 for insertion into the distributed read address counter.

A further operation initiated by the read forward instruction word in the control register is the sending of a suitable control signal to the particular peripheral device or tape device involved so as to initiate a read forward operation. Once this particular read forward instruction word has been completed, the instruction word will released and another instruction word, which may relate to the C section of the word, may be inserted into the control register for performance.

Instruction to the tape unit which is to read forward will initiate an appropriate read forward operation which will require the tape device coming up to speed and the reading of the information from the tape device through the tape control unit, such as the tape control unit 30 illustrated in FIGURE 3. As soon as the first word received from the tape device is available at a buffer circuit within the tape control unit, a signal will be provided to indicate that a transfer should be made to the main memory in accordance with the directions initially stored in the control memory when the read forward instruction word was being operated upon, as described above.

Figure 6:
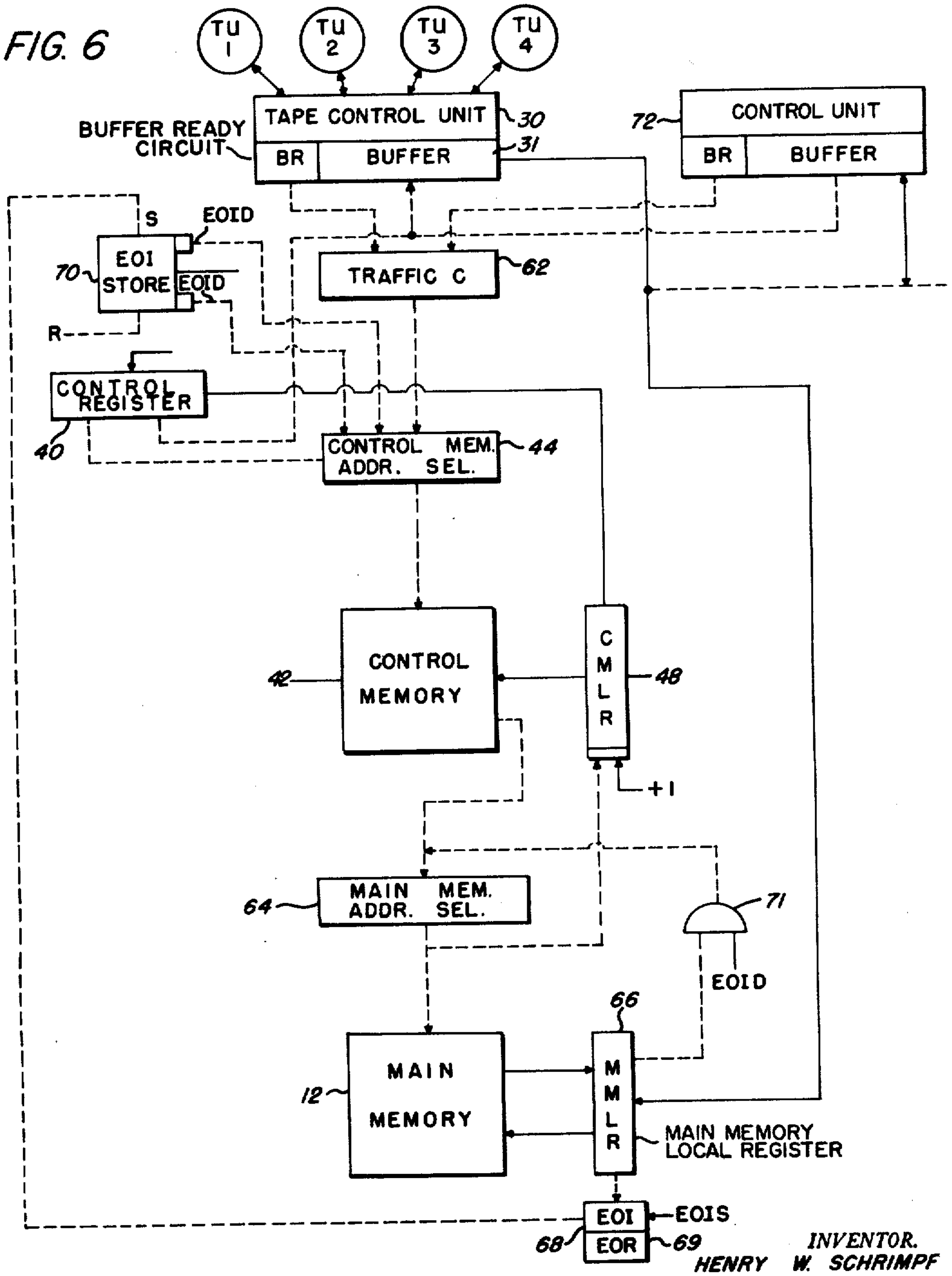
FIGURE 6 illustrates a diagrammatic representation of the features of the present invention as they relate to the use of a control memory and a main memory in a data processing system.

Referring next to FIGURE 6, there is here illustrated that portion of the apparatus for effecting the carrying out of the operation desired, as explained above in particular with respect to FIGURES 1 and 2. Corresponding components between FIGURES 4 and 5 carry corresponding reference characters in FIGURE 6.

Added to the apparatus previously discussed is a traffic control circuit indicated generally at 62. This traffic control circuit may well be arranged in the manner described in the aforementioned application of the present inventor. Also added to the circuit are the elements associated with the main memory 12, namely, a main memory address selector 64 which is adapted to operate at the select lines in the main memory in accordance with well-known principles. The input and the output to the main memory is by way of a main memory local register 66. Monitoring the data passing through the main memory local register is an end-of-item sensing circuit EOI identified by the numeral 68. An end-of-record sensor identified by the numeral 69 may also be connected to sense the data passing through the main memory local register 66. The presence of an end-of-item signal may be appropriately stored in an end-of-item store flip-flop 70, which is arranged to communicate with the control memory address selector 44.

An additional control unit 72 may be provided for communicating with other peripheral devices such as additional tape drive units or the like. As with control unit 30, unit 72 includes a buffer and a buffer ready circuit.

In considering the operation of the apparatus in FIGURE 6, it is first assumed that the instruction word discussed above in connection with FIGURES 4 and 5 has already been processed through the control register 40, and that appropriate control data has been supplied to the tape control unit 30 to initiate the operation of one of the tape units insofar as a particular tape transfer is concerned. Assuming that the instruction word was a read forward word processed in the discussion above under FIGURE 4, and that it is tape until 1 which has been directed to read forward, the read forward will be initiated and data will be supplied from the tape unit into tape control unit 30.

As soon as the first word coming in from the tape unit is received and available in the buffer 31, a buffer ready signal BR will become active to indicate that the buffer is ready to transfer in a word to the main memory. The traffic control circuit 62 will pick up the buffer ready signal BR and will supply an appropriate group activating signal for the control memory address selector 44. This will result in the address selection circuits for the control memory being set in a predetermined code which, in the presently described apparatus, will be the read address counter section of the control memory. Assuming the operation is as described above in connection with FIGURE 2, the number read out of the control memory will be the number 100, which is the specified address for the first word location in the main memory 12. The number 100 will be read directly into the main memory address selector to select the address lines within the main memory 12. The activation of the main memory address lines will permit the word from the buffer 31 to be read into the main memory local register 66 and then into the specified address location.

In order to effect the necessary control action, one form of the present invention was arranged so that the control memory was operating in time phase at approximately one-half cycle of memory time in advance of the main memory cycle. This overlapping of the timing of the two memories permits adequate time for the selection of the appropriate control signals for the main memory and time for the incoming word to be dropped into the main memory local register for insertion into the main memory. As the main memory is receiving the incoming word, the control memory is in the process of conditioning the circuits for receiving another word at a further address. In this regard, the output of the main memory address selector 64 is coupled back into the control memory local register 48. Since the number 100 is assumed to have been written into the control memory address selector 44, a +1 will be added thereto in the control memory local register 48 so that the number reinserted into the control memory at the read address counter location will be the number 101.

As soon as the next word is received in the buffer 31, the traffic control will once again assign the necessary memory cycle for effecting the input transfer of the second word. The operation will continue as aforesaid, with the second word now being inserted into the main memory at address location 101. Inasmuch as there are assumed to be four words in item 1, they will be inserted in the consecutive memory locations 100 through 103.

When an end-of-item word is sensed in the memory local register 66 by the end-of-item sensing circuit 68, a signal will be sent to the end-of-item storage circuit. The end-of-item word will be inserted at the next sequential address location which, in the presently described operation, is address 104. As soon as the next input word of the record is available in the buffer 31, the traffic control will once again send the appropriate control signal to the control memory address selector 44. In this instance, however, with the end-of-item store flip-flop 70 set, the control memory address selector will be set to address the distributed read address counter register in the control memory 42. It is assumed that the number stored in the distributed read address counter register in the control memory 42 is the number 200, which is a specified tabular address in the main memory 12. The number 200 then is read into the main memory address selector 64 to select from the main memory the word that is stored at address location 200. This word is assumed here to be the number 600.

The number 600 is read into the main memory local register 66 and then out to the main memory address selector 64 by way of a gating circuit 71 which is opened by logical signals including the end-of-item signal EOID. The end-of-item store circuit 70 may then be reset so that gate 71 will be closed. The number 600 is then defining the location for the first word of the next item coming in from the buffer 31. The word will then be transferred from the buffer 31 through the main memory local register 66 into the address location 600 in the main memory. The word 600 in the main memory address selector 64 will then be read back into the control memory local register 48, where it will be implemented by unity and then inserted into the read address counter register of the control memory 42. Subsequent sequential words read in the buffer 31 will be appropriately stored in the main memory 12 at the sequential memory location starting with the next address 601, and continuing on through until the end-of-item word has been recorded or stored in the main memory. With six words coming in, and with an end-of-item word, the last memory location in this operation will be at address location 606.

With the entry of a further end-of-item word in the main memory local register 66, the distributed operation described above will again take place so that the next distributed address will be available for selecting the place for recording or storing word 1 of item 3. This operation will continue until such time as no further valid information is coming in from the tape unit to which the read forward instruction was given.

It will be noted in connection with the end-of-item operation wherein there is a change from one read address location to another, that two operation cycles, each of which comprises a control memory cycle and a main memory cycle, are assigned to this particular operation. The first operation cycle is the selection of the new address for the first word of the next item which involves selection of this data from the main memory. The next operation cycle involves the actual transfer of the first word of the next item into the newly selected main memory address. It should also be noted in connection with the above that during the first cycle when the distributed read address counter was read into the main memory address selectors, it was also transferred to the control memory local register and incremented by unity. After incrementing, it was restored back into the control memory. Thus, in the example, the contents of the distributed read address counter was changed from 200 to 201. This was followed by a main memory read out from the location 200 of the word 600, which was placed in the main memory address selectors. During the second cycle, the word 600 was placed in the control memory local register and incremented by unity. The number 601 was placed in the read address counter. This was followed by a transfer of data from the buffer into the main memory location 600. This ensures that when the next distributed read operation takes place, because of the sensing of an end-of-item word, the number in the distributed read address counter register in the control memory 42 will specify the appropriate location for the next first address of the first word of the next incoming item.

It will be readily apparent that the tabular address section 20 of FIGURE 2 may be implemented in many well-known ways familiar to programmers of data processing systems, and that the flexibility in this regard is limited solely by the memory capacity and the extent to which a programmer desires to distribute the items within the capacity of the system. It will further be readily apparent that the implementation of the invention may be carried out using either serial or parallel techniques, or combinations of both.

Should a tape read reverse signal be given, the control data inserted into the read address counter register in control memory 42 will have a negative sign. This means that as this control data is recirculated back into the register each time it is used, the number will be decremented by unity since a +1 will be added to the negative control number.

When a write forward index is to be processed, the same basic operation is carried out as described above. The only exceptions relate to the special registers selected in the control memory. For a writing operation, there are two special registers assigned, one termed the write address counter register and the other termed the distributed write address counter register. Each of these registers is at a special location which relates to the functions as defined by control memory addresses.

In one embodiment of the invention, the control memory 42 was provided with read and write counter registers, as well as distributed read and write counter registers, for eight control units. In other words, one set of control data and one set of registers were associated with each control unit buffer. Thus, additional control units such as the unit 72 shown in FIGURE 6 may communicate with the central processor by way of the traffic control circuit 62, with the sequencing being effected as described in the abovementioned Schrimpf application.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure Letters Patent is:

1. A data manipulating apparatus comprising data supply means having a plurality of data items therein each arranged as a plurality of data words, and an end-of-item indicator separating the respective items, a memory unit having a plurality of separately addressable storage locations to which all of said data is to be transferred, a memory address selector, control means adapted to store address data defining an address in said memory unit, means including said control means activated by each incoming data word to transfer directly the data word unmodified to an address location specified by said address data from said control means, means including said control means modifying the address defining data each time said address data is used, an end-of-item indicator sensing means, and means including said end-of-item sensing means connected to effect modification of the address data in said control means.

2. A data manipulating apparatus comprising data supply means having a plurality of data items therein each arranged as a plurality of data words, and an end-of-item indicator separating the respective items, a memory unit having a plurality of separately addressable storage locations to which all of said data is to be transferred, a memory address selector, control means adapted to store address data defining an address in said memory unit, means including said control means activated by each incoming data word to transfer directly the data word unmodified to an address location specified by said address data from said control means, means including said control means modifying the address defining data each time said address data is used, an end-of-item indicator sensing means, and means including said end-of-item sensing means connected to effect modification of the address data in said control means, said last-named means comprising memory output sensing means connected to said memory address selector and to said control means.

3. A data manipulating apparatus comprising data supply means having a plurality of data items therein each arranged as a plurality of data words, and an end-of-item indicator separating the respective items, a memory unit having a plurality of separately addressable storage locations to which all of said data is to be transferred, a memory address selector, control means adapted to store address data defining an address in said memory unit, means including said control means activated by each incoming data word to transfer directly the data word unmodified to an address location specified by said address data from said control means, means including said control means modifying the address defining data each time said address data is used, an end-of-item indicator sensing means, and means including said end-of-item sensing means connected to effect modification of the address data in said control means, said last-named means comprising memory output sensing means connected to said memory address selector and to said control means, said control means modifying the data received from said memory output sensing means.

4. Apparatus for arranging a plurality of data words in an addressable main memory comprising a control memory having a plurality of addressable storage positions, a control memory address selector, means connected to said control memory address selector to set a predetermined address therein indicative of an incoming word, a main memory address selector, means including said control memory address selector reading an address for said main memory from said predetermined address in said control memory into said main memory address selector to select a location in said main memory for said incoming word, and means connected to said control memory to modify the main memory address from said predetermined address in said control memory and reinsert said modified main memory address at said predetermined address in said control memory.

5. Apparatus for transferring a plurality of data words relative to an addressable main memory comprising a control memory having a plurality of addressable storage positions, a control memory address selector, means connected to said control memory address selector to set a predetermined address therein indicative of the need for a data word to be transferred, a main memory address selector, means including said control memory address selector reading an address for said main memory from said control memory into said main memory address selector to select a location for said data word which is to be transferred, and means connected to said control memory to modify the main memory address from said predetermined address in said control memory and reinsert said modified main memory address at said predetermined address in said control memory.

6. Apparatus for transferring a plurality of data words relative to an addressable main memory comprising a control memory having a plurality of addressable storage positions, a control memory address selector, means connected to said control memory address selector to set a predetermined address therein indicative of the need of a word to be transferred, a main memory address selector, means including said control memory address selector reading an address for said main memory from said control memory into said main memory address selector to select a location for said word which is to be transferred, means connected to said control memory to modify the main memory address from said control memory and reinsert said modified main memory address at said predetermined address in said control memory, and means connected to said control memory to effect a transfer from said main memory of substitute control data for insertion in said predetermined address in said control memory.

7. In a data processing apparatus, the combination comprising a main memory, said memory being adapted to store data words each at a separately addressable location, a main memory address selector for selecting the address for each data word in said main memory, a control memory having a plurality of addressable storage locations, said control memory being adapted to store control data for said main memory, a control memory address selector, a data transfer circuit, indicating means connected to said last-named circuit to indicate said transfer circuit is conditioned to transfer a data word, means including said indicating means setting an address in said control memory address selector, control memory activating means connected to said control memory to read control data therefrom at a selected address location into said main memory address selector, means including said main memory address selector effecting a direct transfer of data without modification between said transfer circuit and said main memory, and means connected to said control memory to modify the control data read into said main memory address selector.

8. Apparatus for arranging a plurality of data words in an addressable main memory comprising a control memory having addressable storage locations, a control memory address selector, means connected to said control memory address selector to set a first predetermined address therein indicative of a word to be transferred, a main memory address selector, means including said control memory address selector reading an address from said control memory into said main memory address selector to select a location in said main memory for said incoming word, means connected to said control memory to modify the main memory address from said control memory and reinsert said modified main memory address at said predetermined address, word sensing means connected to said main memory to sense the contents of each word transferred, said word sensing means being connected to said control memory address selector to set a second predetermined address therein so that a special address in said main memory will be selected and data at said special address will be inserted into said first predetermined address in said control memory.

9. In a data processing apparatus, the combination comprising a main memory, said memory being adapted to store data words at separately addressable storage locations, a main memory address selector for selecting the address for each data word in said main memory, a control memory having a plurality of addressable storage locations, said control memory being adapted to store control data for said main memory, a control memory address selector, a data transfer circuit, indicating means connected to said last-named circuit to indicate said transfer circuit is conditioned to transfer a data word, means including said indicating means setting a first address in said control memory address selector, control memory activating means connected to said control memory to read control data therefrom into said main memory address selector, means including said main memory address selector effecting a transfer of data between said transfer circuit and said main memory, means connected to said control memory to modify the control data read into said main memory address selector, selective data sensing means connected to said data transfer circuit, means connecting said data sensing means to said control memory address selector to set a second address therein, and means including said data sensing means effecting a change of the data in said control memory at said first address.

10. Apparatus for arranging a plurality of data words in an addressable main memory comprising a control memory having a plurality of addressable storage locations, a control memory address selector, means connected to said control memory address selector to set a predetermined address therein indicative of a word to be transferred, a main memory address selector, means including said control memory address selector reading a first address from said control memory into said main memory address selector to select a location for said incoming word, and means connected to said control memory to modify by unity the main memory address from said control memory and reinsert said modified main memory address at said predetermined address in said control memory.

11. In a data processing apparatus, the combination comprising a main memory, said memory being adapted to store data words at separately addressable storage locations, a main memory address selector connected to said main memory for selecting the address for each data word in said main memory, a control memory having a plurality of addressable storage locations, said control memory being adapted to store control data for said main memory, a control memory address selector connected to said control memory, a data supply apparatus adapted to supply data words in a forward or reverse order, a data transfer circuit, word indicating means connected to said last-named circuit to indicate said transfer circuit is conditioned to transfer a data word, word direction sensing means, means including said word indicating means setting an address in said control memory address selector, control memory activating means connected to said control memory to read control data therefrom into said main memory address selector, means including said word direction sensing means setting the sign on said control data in accordance with the order in which said words are supplied, means including said main memory address selector connected to effect a direct transfer of data without modification between said transfer circuit and said main memory, and means connected to said control memory to modify the control data read into said main memory address selector in accordance with the sign thereof.

(References on following page)

References Cited in the file of this patent

UNITED STATES PATENTS

| | | |
|---|---|---|
| 2,916,210 | Selmer | Dec. 8, 1959 |
| 2,923,589 | Curtis | Feb. 2, 1960 |
| 2,951,232 | Amdahl et al. | Aug. 30, 1960 |
| 2,960,683 | Gregory et al. | Nov. 16, 1960 |
| 2,961,643 | Ayres | Nov. 22, 1960 |
| 3,063,036 | Reach et al. | Nov. 6, 1962 |

OTHER REFERENCES

I.B.M. Preliminary Manual of Operation for Type 705 Electronic Data-Processing Machines, 1955, pp. 20–21 relied on.

"Faster, Faster," by Eckert et al., McGraw-Hill Book Co., 1955, pp. 51–59.

"Programming the IBM 650," by Richard V. Andree; Holt, Rinehart and Winston, Inc., 1958, pp. 42–45.

Notice of Adverse Decision in Interference

In Interference No. 95,692 involving Patent No. 3,142,043, H. W. Schrimpf, INFORMATION HANDLING APPARATUS FOR DISTRIBUTING DATA IN A STORAGE APPARATUS, final judgment adverse to the patentee was rendered Aug. 26, 1968, as to claims 1–10.

[*Official Gazette October 29, 1968.*]